Jan. 25, 1966     J. S. WELLES     3,230,639
LOAD LEVELLER FOR HARVESTING WAGONS
Filed Nov. 6, 1962     3 Sheets-Sheet 1

INVENTOR
JACOB SLOAT WELLES
BY
ATTORNEY

Jan. 25, 1966  J. S. WELLES  3,230,639
LOAD LEVELLER FOR HARVESTING WAGONS
Filed Nov. 6, 1962  3 Sheets-Sheet 2

INVENTOR.
JACOB SLOAT WELLES
BY
ATTORNEY

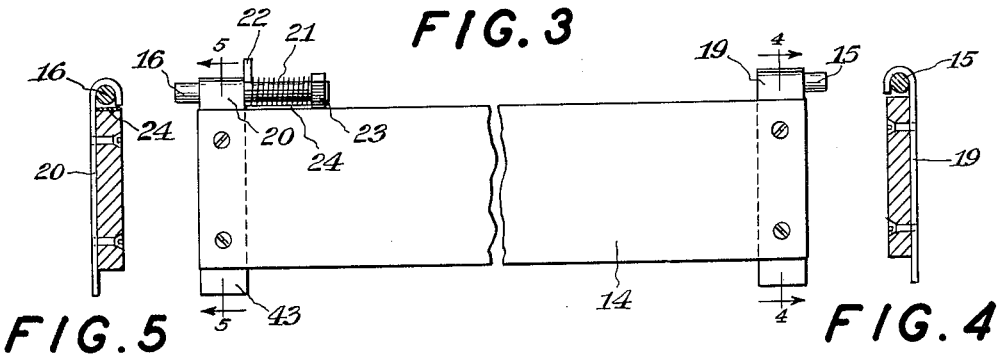
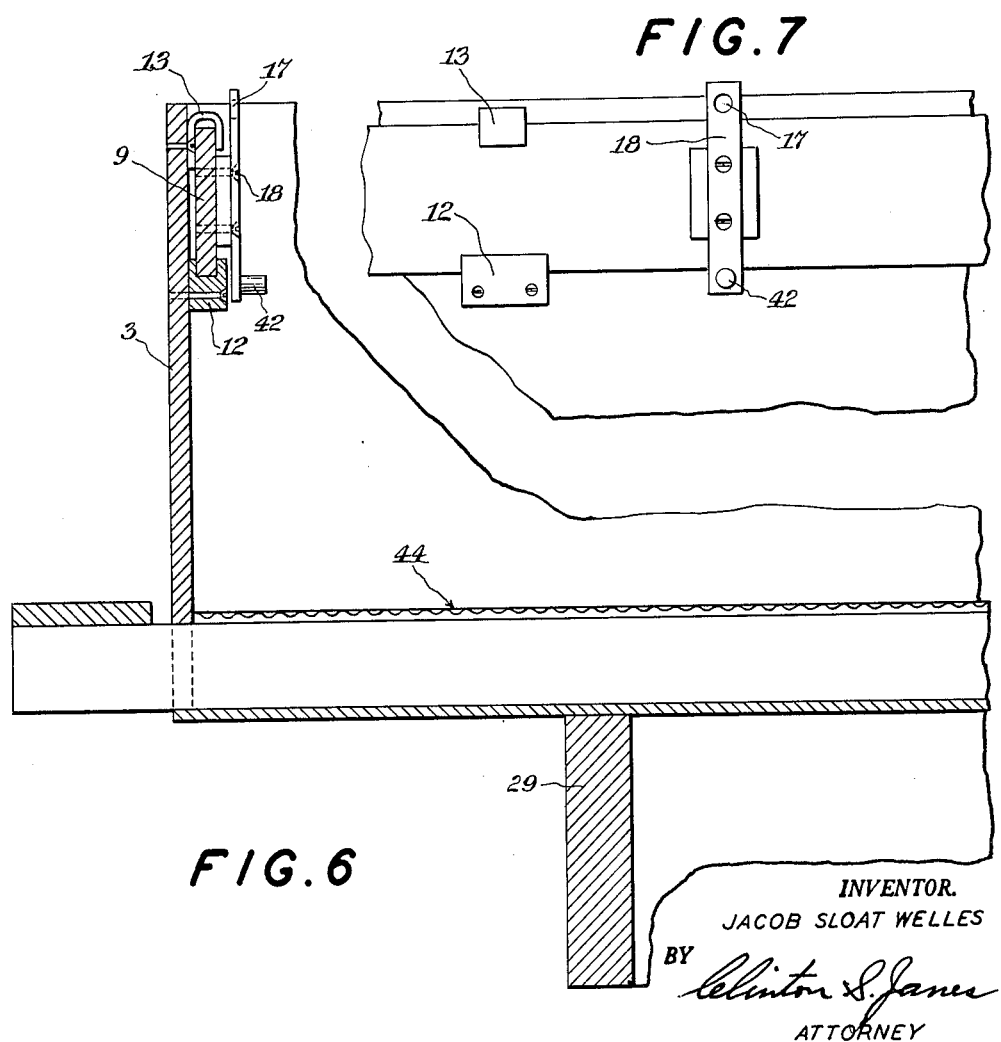

United States Patent Office 3,230,639
Patented Jan. 25, 1966

3,230,639
LOAD LEVELLER FOR HARVESTING WAGONS
Jacob Sloat Welles, Rte. 1, Elmira, N.Y.
Filed Nov. 6, 1962, Ser. No. 235,643
2 Claims. (Cl. 34—233)

The present invention relates to a load leveller for harvesting wagons and the like, and more particularly to a device controlled by the operator of a tractor for spreading and levelling the load of grain in a trailer drawn by the tractor and receiving the grain harvested by mechanism operated by the tractor.

In grain harvesting mechanism such as a tractor-operated combination corn picker, husker and sheller, it is customary to discharge the shelled corn into an open trailer wagon drawn by the tractor. This is accomplished by suitable elevator and conveyer means including a discharge chute or spout usually so located as to deposit the grain in the wagon a few feet back of the front end of the wagon box. With this arrangement it becomes necessary for the operator to stop periodically and go back to the trailer to level out the grain with a shovel, in order to properly load the wagon box.

The present invention is a simple mechanical device for moving the shelled corn toward the rear of a wagon trailer hitched behind a corn picker-sheller machine drawn by a tractor. This device is operated by hydraulic power piped from the tractor and keeps the wagon filling evenly over the full length of the box. Thus the load of grain, when the wagon is fully loaded, is level and ready to be dried.

Corn picker-sheller machines elevate the shelled corn by means of a short elevator at the rear and discharge it into a wagon trailed behind it. As the corn is thus deposited in the front end of the wagon box where it rapidly piles up it has to be moved back to fill the box. This means the tractor operator must stop, go back to the wagon, and shovel the corn back, thus delaying the harvesting and causing hard manual labor. This invention permits the operator to keep the corn evenly filling the wagon box by simply moving the hydraulic lever on the tractor as often as needed without having to stop the harvesting machinery. This saves valuable time and hand labor which farmers appreciate.

Maintaining the load evenly is particularly important when the trailer is of the dryer-wagon type. These vehicles have a manifold or plenum chamber beneath the floor of the wagon box. Said floor is perforated to allow hot air charged by a dryer fan into the plenum chamber, to be forced up through the grain in the wagon box to dry it sufficiently to keep in storage. In order for this operation to be effective it is necessary for the grain to be maintained at a substantially uniform depth over the entire floor of the wagon box during the drying process.

It is an object of the present invention to provide a novel manually controlled device for maintaining the grain being harvested in a wagon box or the like at a substantially uniform depth throughout the box while the wagon is being loaded.

It is another object to provide such a device which is susceptible to convenient remote control as by an operator of a tractor drawing said wagon, without the necessity of interrupting the harvesting operation in order to perform the levelling operation by hand.

It is another object to provide such a device which is simple in construction, efficient in operation and economical to manufacture.

Further objects and advantages will be apparent from the following description taken in connection with the accompanying drawing, in which:

FIG. 3 is a side elevation of one of the pivoted levelling paddles;

FIG. 4 is a section taken substantially on the line 4—4 of FIG. 3;

FIG. 5 is a section taken substantially on the line 5—5 of FIG. 3;

FIG. 6 is an enlarged transverse sectional detail of the wagon box and supporting structure showing the plenum chamber and the perforated floor together with the mounting means for one of the sliding panels on the side of the wagon box which carry the levelling paddles; and FIG. 7 is an enlarged detail in side elevation of a portion of a sliding panel and the paddle supporting bracket mounted thereon, with the paddle detached to show the structure of the bracket.

Figure 1:
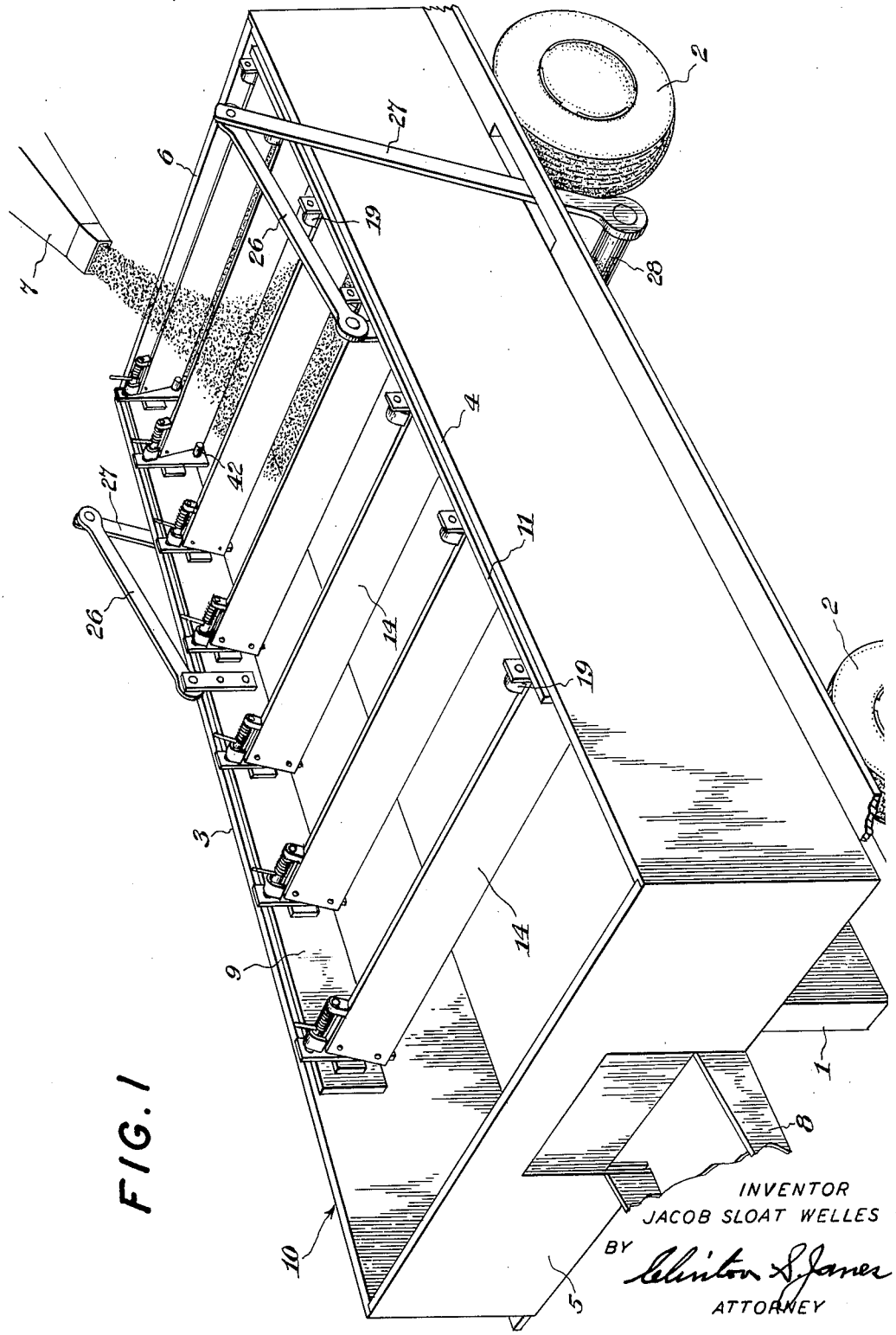
FIG. 1 is a perspective view of a conventional open box wagon embodying a preferred form of the present invention, together with the loading chute therefor, viewed from above at the rear of the wagon.

In FIG. 1 of the drawing there is illustrated a generally rectangular open box type of wagon comprising a chassis 1 mounted on wheels 2, carrying a wagon box, indicated generally by numeral 10, comprising side walls 3 and 4 and end walls 5 and 6. A chute indicated by numeral 7 and forming part of the harvesting mechanism is illustrated in the usual position where it discharges the grain such as shelled corn into the wagon box a short distance to the rear from the front wall 6 thereof. A discharge chute 8 fixed in any suitable manner to the rear wall 5 of the vehicle is arranged to direct the granular material on to a desired receptacle such as a silo-loading device, when the front end of the vehicle is tilted up for that purpose in the conventional manner.

In order to distribute the loaded grain evenly in the wagon box, a pair of panels 9 and 11 are slidably mounted on the sides 3 and 4 respectively of the wagon box 10 by means of channel guides 12, 13 (FIG. 6), and a plurality of paddles or floats 14 are pendulously supported on said panels in substantially equally spaced parallel relation transversely of the wagon box.

Figure 2:
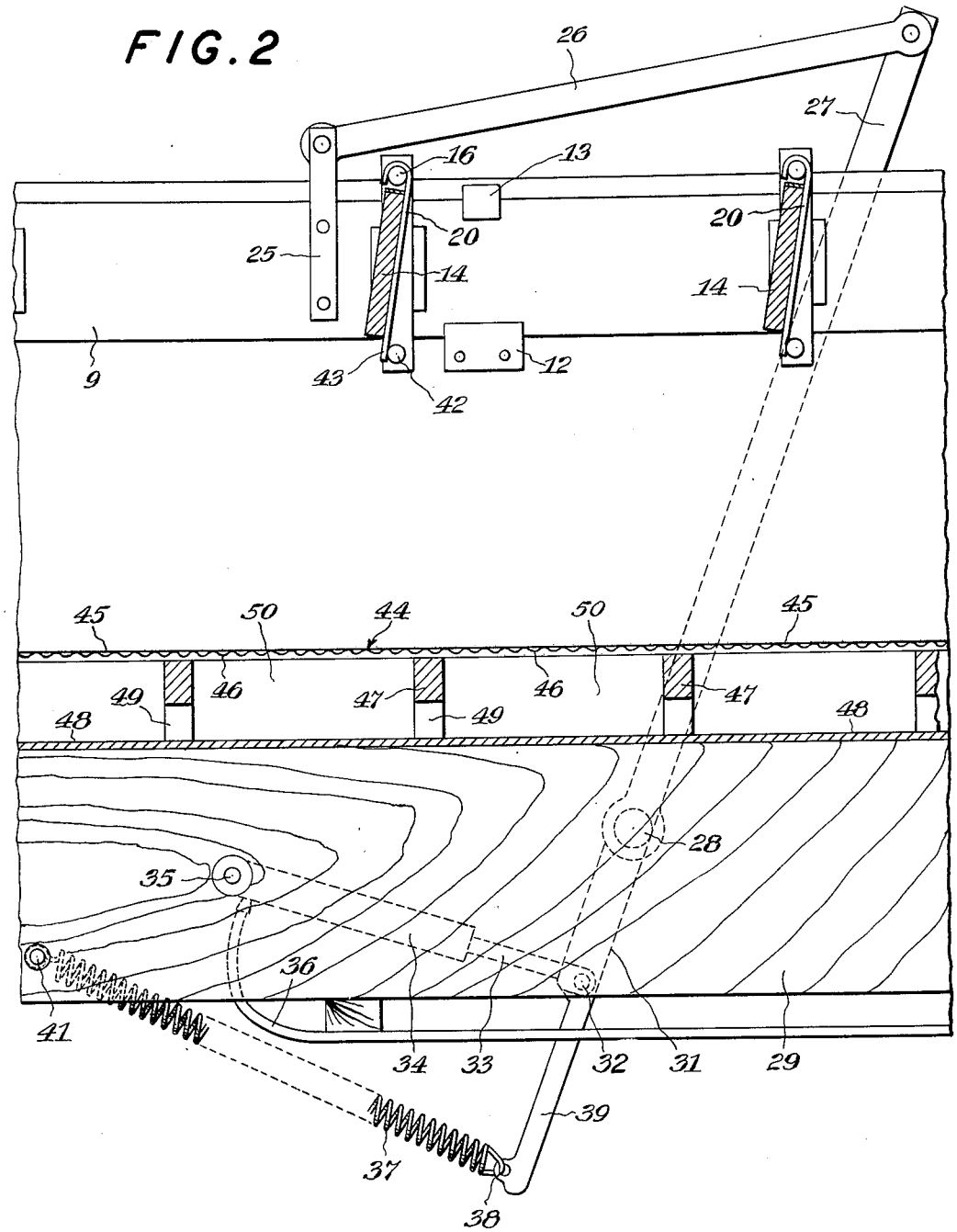
FIG. 2 is an enlarged midsectional detail of the wagon showing the operating mechanism for the grain levelling paddles.

As best shown in FIGS. 2 and 3, this is accomplished by mounting bearing pins or gudgeons 15 and 16 on the ends of each paddle, which gudgeons are arranged to bear in openings 17 in pivotal supports in the form of brackets 18 fixedly mounted on the sliding panels as best seen in FIGS. 6 and 7.

The gudgeons 15 are rigidly mounted on the paddles 14 by means of hangers 19, but the gudgeons 16 are preferably slidably mounted in bearing hangers 20, and normally maintained in projected position as illustrated in FIG. 3 by means of compression springs 21 bearing at one end against pins 22 projecting from said gudgeons and at their other ends against abutments 23 rigidly connected by metal straps 24 to the holders 20. The pins 22 serve as handles for withdrawing the slidable gudgeons 16 from their openings 17 in the brackets 18 to permit removal of the paddles when desired.

An operating post 25 (FIG. 2) is fixedly mounted on the panel 9 in any suitable manner and is connected by link 26 to an actuating lever 27 rigidly mounted on a cross-shaft 28 which is journalled on the sills 29 of the wagon chassis.

The means for operating the sliding panel 11 as seen in FIG. 1, is identical with that for operating the panel 9 as illustrated in FIG. 2, so that the panels 9 and 11 reciprocate in unison, thereby maintaining the paddles substantially parallel to the ends of the wagon box.

Means for oscillating the cross-shaft 28 in order to reciprocate the panels 9 and 11 is provided comprising an actuating arm 31 rigidly mounted on said shaft and pivotally connected at 32 to the plunger 33 on a hydraulic ram 34, the cylinder of which is pivoted as indicated at 35 to the chassis of the vehicle. A hose line 36 connected to a manually controlled source of fluid pressure on the tractor enables the operator to actuate the plunger 33 to thereby rotate the cross-shaft 28 in a counter-clockwise direction as viewed in FIG. 2 and cause the panels 9 and 11 to move toward the rear of the wagon box. A spring 37 attached at 38 to an extension 39 of the actuating arm 31 and anchored at 41 to the vehicle chassis, serves to return the parts to their normal positions when the pressure in the cylinder of ram 34 is released by the operator.

It will be understood that the ram 34 may, if desired, be of double acting type in which hydraulic pressure under the control of the operator may be selectively admitted to the cylinder of the ram either above or below the piston of plunger 33. Since such an arrangement requires two hose connections, a packing gland for plunger 33 and a two-way control valve, the simpler form illustrated is preferred. Either arrangement of course enables the operator of the tractor to conveniently level out the grain in the trailer-wagon as it is being loaded, without leaving his seat or interrupting the progress of the vehicles.

In order to make the reciprocation of the paddles 14 effective to convey and distribute the grain over the bed of the wagon box, each of the brackets 18 is provided at its lower end with a pin 42 projecting into the path of the lower ends 43 of the adjacent hanger members 19, 20. By this arrangement it will be seen that when the paddles 14 rest against the rear sides of the pins 42 as seen in FIG. 2, the paddles will be carried bodily rearward by the panels 9, 11 without swinging movement, but on the return forward movement, the paddles are free to pivot and slide over the grain, thus securing the desired conveyer action.

In order to provide for conveying the grain in both directions away from the discharge point of the loading chute 7, the paddles are free to be turned over on their pivotal supports to thereby reverse the conveyer action thereof.

When, as shown in FIG. 1, the chute 7 is positioned to discharge the grain near the forward end of the wagon box, the paddles at the rear of this point are positioned as illustrated in FIG. 2 to convey the grain to the rear, whereas the paddles located forwardly of that point are turned over so as to bear against the forward sides of the pins 42 and convey the grain forwardly.

It will be understood that the width of the paddles 14 is such that they extend below the top edges of the sides 3 and 4 of the wagon box sufficiently to perform their levelling function without the necessity of excessive force being applied.

In order to perform its function as a dryer wagon, the bed 44 of the box is made of foraminous material such as a perforated metal sheet 45 resting on an expanded metal reenforcement 46. The screen-like bed so formed is supported by means of floor beams 47 in spaced relation to the closed bottom 48 of the box which rests on the sills 29 of the chassis frame. The floor beams are provided with suitable openings 49 whereby the space 50 forms a plenum chamber beneath the perforated floor 44. Any suitable means, not here illustrated, are provided in the usual manner for blowing hot air into this plenum chamber from which it escapes upward through the grain resting thereon in order to perform the drying operation.

The structure of the dryer wagon per se is not considered inventively different from dryer wagons heretofore known, but the combination with an open-box dryer wagon, of a remote controlled levelling means for increasing the effectiveness of the dryer mechanism as disclosed by applicant is believed to be novel.

Although certain structure has been shown and described in detail it will be understood that changes may be made in the design and dimensions of the parts without departing from the spirit of the invention.

What is claimed is:

1. In a load leveller for grain harvesting wagons and the like, in combination with a wagon box having parallel sides, a plurality of pivotal supports,
   means for mounting said pivotal supports adjacent the upper edges of said sides in transversely alined pairs and in spaced relation along said sides,
   a plurality of substantially rectangular paddles extending across said wagon box and hinged adjacent their upper edges to said pairs of pivotal supports,
   means for reciprocating said mounting means in unison endwise of said wagon box, and
   means for preventing swinging movement of the paddles on said pivotal supports in one direction while permitting such movement in the opposite direction, to thereby produce a conveyer action on the grain being harvested;
   the mounting means for the pivotal supports comprising a pair of panels slidably mounted on the opposite sides of the wagon box, and
   said pivotal supports comprising brackets fixedly mounted on said panels in spaced relation, having bearing openings adjacent the upper edges of said panels, and
   said paddles being provided with pivot pins journalled in said bearing openings,
   one of the pivot pins for each paddle being retractable to permit dismounting the paddle.

2. In a load leveller for grain harvesting wagons and the like, in combination with a wagon box having parallel sides, a plurality of pivotal supports,
   means for mounting said pivotal supports adjacent the upper edges of said sides in transversely alined pairs and in spaced relation along said sides,
   a plurality of substantially rectangular paddles extending across said wagon box and hinged adjacent their upper edges to said pairs of pivotal supports,
   means for reciprocating said mounting means in unison endwise of said wagon box, and
   means for preventing swinging movement of the paddles on said pivotal supports in one direction while permitting such movement in the opposite direction, to thereby produce a conveyer action on the grain being harvested;
   the mounting means for the pivotal supports comprising a pair of panels slidably mounted on the opposite sides of the wagon box, and
   said pivotal supports comprising brackets fixedly mounted on said panels in spaced relation, having bearing openings adjacent the upper edges of said panels, and
   said paddles being provided with pivot pins journalled in said bearing openings,
   the means for controlling swinging movement of the paddles comprising pins fixed in said brackets adjacent the lower edges of said panels in position to form abutments engageable by said paddles,
   the pivotal supports of said paddles being arranged to allow the paddles to be turned over to reverse the direction of their conveyer action.

(References on following page)

References Cited by the Examiner

UNITED STATES PATENTS

| | | | |
|---|---|---|---|
| 515,513 | 2/1894 | Bisbee | 34—236 X |
| 1,197,263 | 9/1916 | Carney et al. | 198—221 X |
| 1,200,531 | 10/1916 | Sargent | 34—206 X |
| 1,299,661 | 4/1919 | Beam | 198—221 X |
| 2,565,815 | 8/1951 | Heikens | 56—208 |
| 2,714,259 | 8/1955 | Best et al. | 34—233 |
| 2,777,212 | 1/1957 | McComber | 34—133 |
| 2,964,126 | 12/1960 | Petersen | 198—224 X |
| 3,046,043 | 9/1962 | Matteson | 292—175 |

FOREIGN PATENTS 783,309 9/1957 Great Britain.

OTHER REFERENCES

"Mechanical Engineers Handbook" by L. S. Marks, McGraw-Hill, New York, pp. 1755 and 1756 (Figure 3).

WILLIAM F. O'DEA, *Primary Examiner.*

NORMAN YUDKOFF, *Examiner.*

J. SOFER, C. R. REMKE, *Assistant Examiners.*